(12) United States Patent
Cabrera et al.

(10) Patent No.: US 6,421,684 B1
(45) Date of Patent: Jul. 16, 2002

(54) PERSISTENT VOLUME MOUNT POINTS

(75) Inventors: Luis Felipe Cabrera, Bellevue; Norbert P. Kusters, Woodinville, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/652,525

(22) Filed: Aug. 31, 2000

Related U.S. Application Data

(63) Continuation of application No. 09/097,061, filed on Jun. 12, 1998, now Pat. No. 6,119,131.

(51) Int. Cl.[7] .............................................. G06F 17/30
(52) U.S. Cl. ........................ 707/200; 707/202; 707/205
(58) Field of Search ................................. 707/200, 201, 707/202, 203, 204, 205, 206, 9, 10; 709/206, 203, 226, 328; 711/4, 118; 714/15, 4; 117/6

(56) References Cited

U.S. PATENT DOCUMENTS

| | | | |
|---|---|---|---|
| 5,014,192 A | * | 5/1991 | Mansfield et al. .............. 707/1 |
| 5,896,546 A | | 4/1999 | Monahan et al. .............. 710/10 |
| 6,182,158 B1 | * | 1/2001 | Kougiouris et al. ........ 709/328 |

OTHER PUBLICATIONS (IEEE publication) Highly available directory services in DCE by Acevedo, B. et al. in Fault Tolerant Computing, pp. 387–391 Jun. 1996).*

(IEEE publication) Bending hierarchical and attribute–based file naming by Sechrest, S. et al. in Distributed Computing Systems, pp. 572–580 (Jun. 1992).*

* cited by examiner

Primary Examiner—Diane D. Mizrahi
(74) Attorney, Agent, or Firm—Merchant & Gould P.C.

(57) ABSTRACT

Information regarding volume mount points hosted by a logical volume are stored on the physical device underlying the logical volume so that the relationships between the host logical volume and target logical volumes mounted on the volume mount points can be reconstituted when the system containing the logical volumes is rebooted, when the underlying physical devices are moved with the system, and when the logical volumes are transported to a different system. A data structure stored on the physical device contains the directory name of the volume mount point and the unique identifier and a globally unique mount name of the target logical volume mounted at the volume mount point. When the target logical volume is present in the system, symbolic links are created to relate the volume mount point name to a device name for the target logical volume so that pathnames containing the directory junction name are resolved correctly. If the target volume is not present in the system, the corresponding symbolic link does not exist, so an incorrect logical volume cannot be mounted onto a volume mount point. Furthermore, because the logical volumes contain the directory junction information, the namespace representing the logical volumes is selfdescribing so that neither user knowledge nor intervention is required to reconstitute the namespace.

27 Claims, 7 Drawing Sheets

PERSISTENT VOLUME MOUNT POINTS

RELATED APPLICATIONS

This is a continuation of U.S. patent application Ser. No.: 09/097,061, filed Jun. 12, 1998, which application is incorporated herein by reference, now U.S. Pat. No. 6,119,131.

This application is related to the co-assigned and co-filed pending U.S. patent applications titled "Logical Volume Mount Manager", pending U.S. patent application Ser. No. 09/096,772, filed Jun. 12, 1998 and "Persistent Names for Logical Volumes," and pending U.S. patent application Ser. No. 09/096,540, filed Jun. 12, 1998 which are hereby incorporated by reference.

FIELD OF THE INVENTION

This invention relates generally to computer storage device configuration, and more particularly to providing persistent volume mount points for logical volumes mounted in a computer system.

BACKGROUND OF THE INVENTION

Most operating systems associate a logical unit of mass storage with a device name, such as a physical hierarchical name (\device\harddisk0partition1\), and a user-friendly name, such as a drive letter, so that the data on the storage device can be easily accessible by the higher layers of the operating system and user applications. The higher layers of the operating system and user applications assume that the user-friendly names are persistent across boot sessions. In actuality, the names are persistent only as long as the physical configuration of the computer does not change. Persistence cannot be guaranteed because such operating systems assign the user-friendly names in the order in which the storage devices are detected when booting. When the physical locations of the storage devices change, these operating systems will assign the user-friendly names to different devices. Therefore, the consistency of name assignments across multiple boot sessions is not preserved under all circumstances, and the higher operating system layers and user applications will be unable to access the data on the devices without modification.

The process of associating a logical unit, or volume, with the appropriate underlying physical media is commonly referred to in the art as "mounting" the logical volume on the physical media. The logical volume must be mounted before the data on the physical media can be accessed.

Standard file systems are typically arranged in a hierarchical tree-structure commonly referred to as a "namespace" with the logical volumes, directories, and files in the namespace assigned a user-friendly name. When the namespace is graphically represented, each directory is illustrated as an intermediate point in the hierarchy. The higher layers of the operating system and user applications specify a path the namespace hierarchy to a destination to access data.

The hierarchy that encompasses all logical volumes in a computer system is the "global" namespace of the file system. Each logical volume in the computer also has its own "local" namespace which defines directories and files present in the logical volume. A volume mount point in the local namespace of one logical volume is used to "graft" the local namespace of a second logical volume into the namespace of the first logical volume. However, because the user-friendly names are not persistent, the consistency of the volume mount points in the global namespace cannot be guaranteed across multiple boot sessions.

Therefore, there is a need in the art for an operating system that provides persistent user-friendly names and guarantees the consistency of volume mount points despite physical configuration changes in the underlying storage media.

SUMMARY OF THE INVENTION

The above-mentioned shortcomings, disadvantages and problems are addressed by the present invention, which will be understood by reading and studying the following specification.

Unique volume identifiers for logical volumes are used to associate logical volumes created from computer system storage devices with persistent "redirected" mount names to create a self-describing namespace on the computer. Information regarding volume mount points hosted by a logical volume are stored on the physical device underlying the logical volume so that the relationships between the host logical volume and target logical volumes mounted on the volume mount points can be reconstituted when the system containing the logical volumes is rebooted, when the underlying physical devices are moved with the system, and when the logical volumes are transported to a different system. A data structure stored on the physical device contains the directory name of the volume mount point and the unique identifier and a globally unique mount name of the target logical volume mounted at the volume mount point. When the target logical volume is present in the system, symbolic links are created to relate the volume mount point name to a device name for the target logical volume so that pathnames containing the directory junction name are resolved correctly. If the target volume is not present in the system, the corresponding symbolic link does not exist, so an incorrect logical volume cannot be mounted onto a volume mount point.

When the physical configuration of the computer changes, the device name changes but the unique volume identifier does not. The unique volume identifier is used to locate the appropriate mount name and/or drive letter in its data structure and a new symbolic link is created with the new device name so that the symbolic link resolves the mount name and/or drive letter to the correct logical volume under all circumstances.

Because the logical volume is created through its unique volume identifier and is not reliant on the devices being located in any particular order in the system, or being discovered in any particular order during the boot process, or being present only during the boot process, changes in the physical configuration of the computer between boots, or during a boot session, have no effect on the higher layers of the operating system and user applications which rely on the redirected name. Thus, the level of indirection provided by the persistent mount names guarantees that the higher layers of the operating system and user applications will be able to access data on a logical volume for the life of the logical volume without modifications. Furthermore, because the logical volumes contain the volume mount point information, neither user knowledge nor intervention is required to reconstitute the namespace representing the logical volumes.

In one aspect of the invention, a data structure is described that contains the unique volume identifiers and persistent mount names. In another aspect of the invention, a mount manager is described that creates and maintains the data structure.

The present application describes computer systems, methods, and computer-readable media of varying scope.

The mount manager is variously described as causing the processor of a computer to perform certain actions, as a series of steps executed from a computer-readable medium, and in terms of its interaction with objects and other system components in an object-based operating system. However, the invention is equally applicable in environments which provide for associating the unique volume identifiers, the persistent names, and the logical volume without requiring a separate mount manager or the particular data structures described in the present application. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Microsoft Windows NT 5.0 implementation of the invention is described. Finally, in the fifth section, a conclusion of the detailed description is provided.

Hardware and Operating Environment

Figure 1:
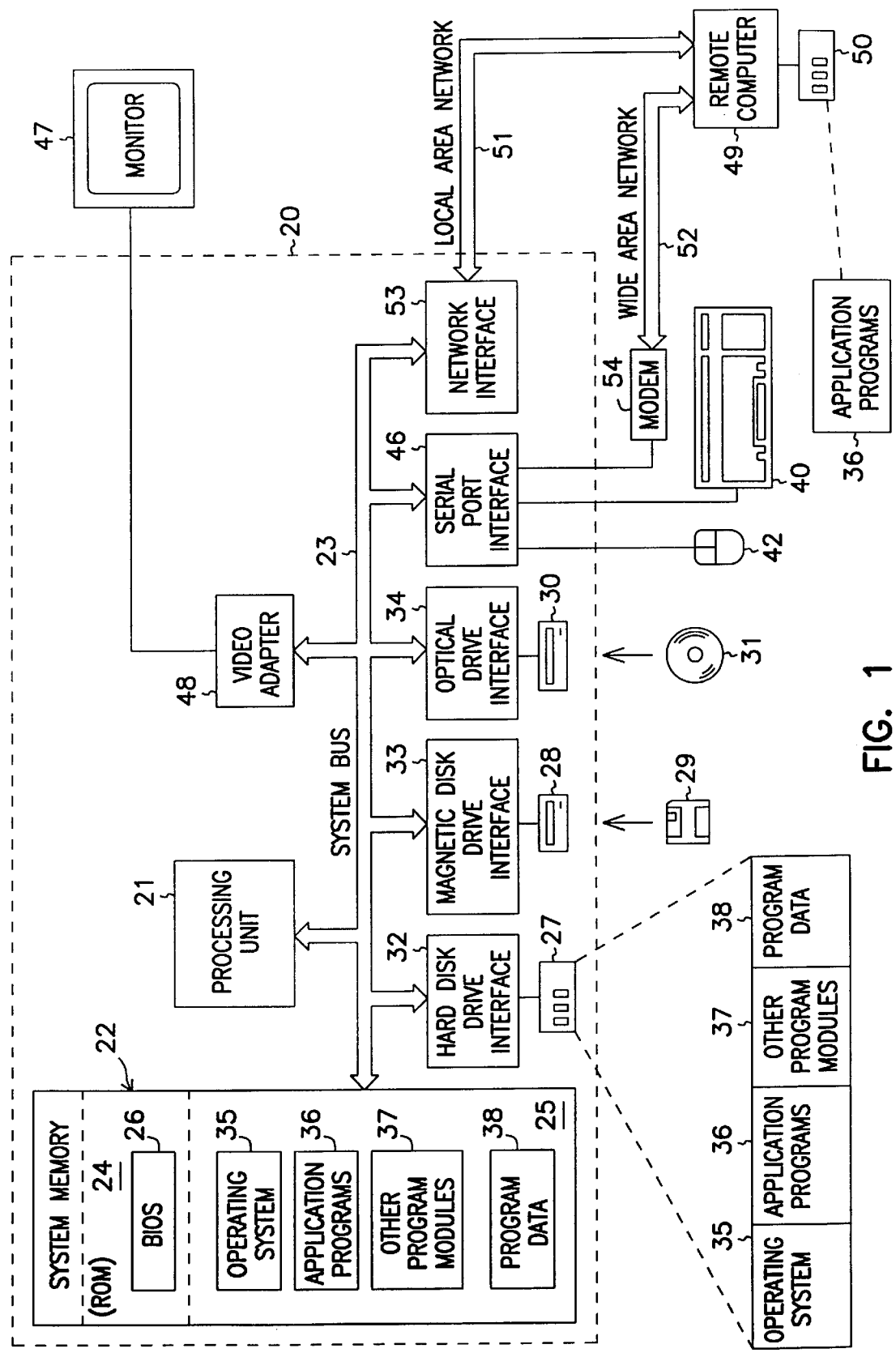
FIG. 1 shows a diagram of the hardware and operating environment in conjunction with which embodiments of the invention can be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer, the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20, the local computer; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet. When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIGS. 2A–B.

Physical media in a computer contains one or more logical volumes. The process of associating a logical volume with the appropriate underlying physical media is commonly referred to in the art as "mounting" the logical volume on the physical media. The logical volume must be mounted before the data on the physical media can be accessed.

Standard file systems are typically arranged in a hierarchical tree-structure commonly referred to as a "namespace." The directory or logical volume at the top of the tree is called the "root." The branches of the tree are files, directories containing files and/or directories, and logical volumes containing directories and/or files. When the namespace is graphically represented, each directory is illustrated as an intermediate point in the hierarchy. Each logical volume, directory, and file is given a name. In many operating systems, a file can be reached by traversing the hierarchical path from the root to the file, such as "C:personnelemployeessalaries" where "C:" is the traditional name of the root volume, "personnel" and "employees" are the names of directories, and "salaries" is the name of a file.

A logical volume represents portions of one or more physical devices which holds the data for the files in the file system. The hierarchy that encompasses all logical volumes in a computer system is the "global" namespace of the file system. Each logical volume in the computer also has its own "local" namespace which defines the directories and files present in the logical volume. A volume mount point in the local namespace of one logical volume is used to "graft" the local namespace of a second logical volume into the namespace of the first logical volume. Thus, a volume mount point is a portal or entry from the first logical volume into the data in the second logical volume. Volume mount points permit a user to be presented with a single view of multiple logical volumes so that the user does not have to specify the path to each individual logical volume in order to access data on the logical volumes. The user's view is independent of the number of the logical volumes and the arrangement of the physical devices underlying the logical volumes.

A volume mount point can be established at any empty directory location, called a "directory junction," in the hierarchy. Directory junction data identifying the logical volume to be mounted at the volume mount point (the "target" logical volume) is stored in the logical volume immediately higher in the global namespace hierarchy (the "host" logical volume). A host logical volume can host more than one volume mount point as will be readily apparent to one skilled in the art.

In the present invention, unique volume identifiers are used to identify and track logical volumes created from storage devices in a computer and to associate persistent "redirected" mount names with a logical volume to create a self-describing namespace which presents a consistent view of the logical volumes in the computer despite physical configuration changes. In the embodiments described herein, the unique volume identifiers and "redirected" mount names are stored in persistent data structure that is created and maintained by a mount manager. The mount manager is shown and described for the sake of clarity in understand the invention but the invention can be practiced in any environment which provides the functions necessary to manage the unique volume identifiers, the redirected mount names, and the associations with the logical volumes.

Figure 2A:
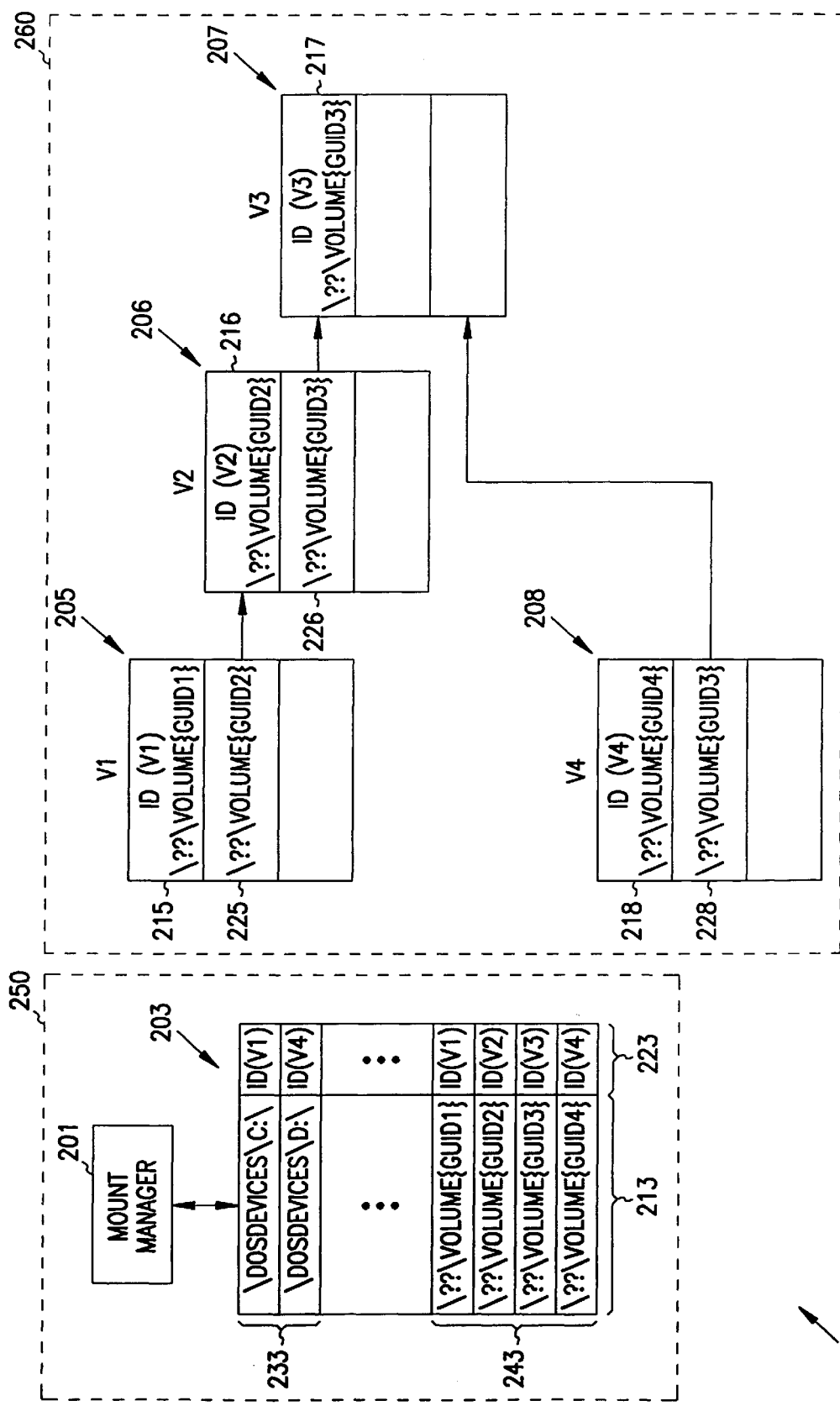
FIG. 2A is a diagram illustrating a system-level overview of an exemplary embodiment of the invention in a computer.

FIG. 2A shows one embodiment of a logical volume mounting subsystem 250 in a computer 200 such as local computer 20 or remote computer 49 in FIG. 1. The physical media, such as hard disk drive 27 in local computer, contains one or more logical volumes. The logical volume mounting subsystem 250 comprises a mount manager 201 and a persistent mount manager data structure 203, and is responsible for associating user-friendly "redirected" names 213, used by the higher layers of the operating system and user applications, with mounted logical storage volumes 205, 206 207, and 208 so that the data on the underlying physical devices can be accessed through the redirected names. In FIG. 2A, the redirected names 233 are shown as drive letters, such as commonly used by personal computer applications, and mount names which have a format similar to a drive letter. The redirected names are not limited to the address format shown in FIG. 2A but are adaptable to the various formats of user-friendly names prevalent in all operating systems, as will be readily apparent to one skilled in the art. The logical storage volumes 205–208 combined make up the global namespace 260 of the computer 200.

The computer operating system (not shown) creates the logical volumes 205–208 from physical removable or fixed media devices, such the hard disk drive 27. Each logical volume is identified by a unique volume identifier 223 which is stored on the physical device, or devices, that make up the logical volume and which is guaranteed to be unique on the particular computer. The unique volume identifier for each logical volume 205, 216, 217 and 208 is shown stored in data structures 215, 216, 217 and 218, respectively, in FIG. 2A. Also stored in the data structures is a mount name for the volume as described further below.

Each logical volume is assigned a device name during the boot process that identifies which device driver in the operating system handles commands directed to the data on the logical volume. The device name can change across boot sessions but is unique for a particular boot session.

The mount manager data structure 203 is maintained by the operating system with other configuration data so that it is persistent across boot sessions. The operating system presents each logical volume 205–208 to the mount manager 201 in the order in which the operating system locates each logical volume in the computer 200 when the computer is booted. The mount manager 201 queries each logical volume 205–208 for its device name and unique volume identifier. The mount manager 201 searches the mount manager data structure 203 to find an entry that contains the unique volume identifier for the logical volume 205–208.

As shown in FIG. 2A, the unique volume identifier "ID(V1)" for logical volume 205 is associated with the drive letter redirected name "DosDevicesC:" and the mount name redirected name "??volume{GUID1}" in the mount manager data structure 203. "DosDevices" represents the root level of a specific namespace within the global namespace 260 of the computer 200 and functions as the entry point for addressable logical volumes within the specific namespace. While "DosDevices" indicates a Microsoft Windows 32-bit type user namespace, the invention is not limited to any particular type of namespace as will be readily apparent to one skilled in the art. The mount name is in the same user-friendly format as the drive letter with "??" being synonymous with DosDevices and GUID1 representing a globally unique identifier that is generated by the operating system. Logical volumes 205 and 208 represent root directories in the global namespace 260.

The mount manager 201 informs the operating system of the associations between the drive letter and the device name, and the mount name and the device name for logical volume 205. The operating system creates a logical, symbolic link between each redirected name and the device name. Similarly, the mount manager 201 causes the operating system to create the appropriate symbolic links when logical volumes 206, 207 and 208 are presented to it.

Because the unique volume identifier 223 for a logical volume is associated with a redirected name 213 in the persistent mount manager data structure 203, the logical volume will be always be assigned the same redirected name, either a drive letter or a mount name, even if the logical volume is presented to the mount manager 201 in a different order. The order in which the logical volumes are presented is dependent upon the order in which they are detected by the operating system so the order changes if the underlying physical devices are rearranged in the computer between boots. The device name of the logical volumes also change when the physical configuration changes. Because the logical volume is identified by the unique volume identifiers 213 rather than the device names, consistency between the mount names and/or drive letters and the logical volumes is assured across boot sessions regardless of the underlying physical configuration of the computer or the order in which the devices are recognized as long as the logical volume is valid.

In the embodiment of the present invention shown in FIG. 2A, the directory junction data stored in a host logical volume comprises the mount name of the target logical volume. The symbolic links for the directory junctions are used when a command references a pathname such as "DosDevicesC:ProgrammingProjectsfilename." In this example "Programming" identifies the directory junction 225 and "Projects" identifies the directory junctions 226, 228.

The pathname must be parsed to determine which logical volume contains "filename." The parsing of the pathname begins with the operating system replacing the prefix "DosDevicesC:" with the device name of the logical volume 205 based on the symbolic link associating DosDevicesC: and the device name. The device name indicates which device driver is then called to continue parsing the pathname. The device driver for logical volume 205 replaces the prefix "Programming" with the device name of the logical volume 206 specified by the ??volume{GUID2}symbolic link, which causes the operating system to invoke the corresponding device driver. In turn, the device driver of the logical volume 206 replaces the prefix "Projects" with the device name of the logical volume 207 specified by the ??volume{GUID3}symbolic link. The device driver for logical volume 207 recognizes the final portion of the pathname, "filename," as referring to a file on logical volume 207 so the parsing is complete and the device driver for logical volume 207 executes the command against the file.

Because the mount name of a logical volume is globally unique, only the correct target logical volume can be mounted at a volume mount point. If the correct target logical volume is not present in the system, the symbolic link will not be resolved. Therefore, the present invention prevents errors in mounting logical volumes without the intervention of the system administrator and creates a "self-describing" namespace.

When a new logical volume is introduced into the system, the mount manager 201 creates an entry in the data structure 203 and a mount name for the logical volume if the logical volume does not already have a mount name. The mount manager 201 also searches the data structure 203 for an available drive letter redirected name to assign to the logical volume unless instructed otherwise. The mount manager 201 inserts the unique volume identifier for the logical volume into the data structure 203 entry for the next available drive letter, and requests that the operating system 205 create the symbolic link for the association.

If no drive letters are available, or if the logical volume is not to be assigned a drive letter, the mount name ensures that the logical volume is addressable by higher layers of the operating system and user applications.

Furthermore, the data structures and the stored directory junction data means that if some, or all, of the devices comprising the global namespace of one computer are mounted in the global namespace of another computer, the volume mount points internal to the first global namespace continue to resolve correctly. This situation can arise in a failover computer cluster when one of the clustered computers fails and its global namespace is grafted onto the global namespace of one of the other computers in the cluster.

Figure 2B:
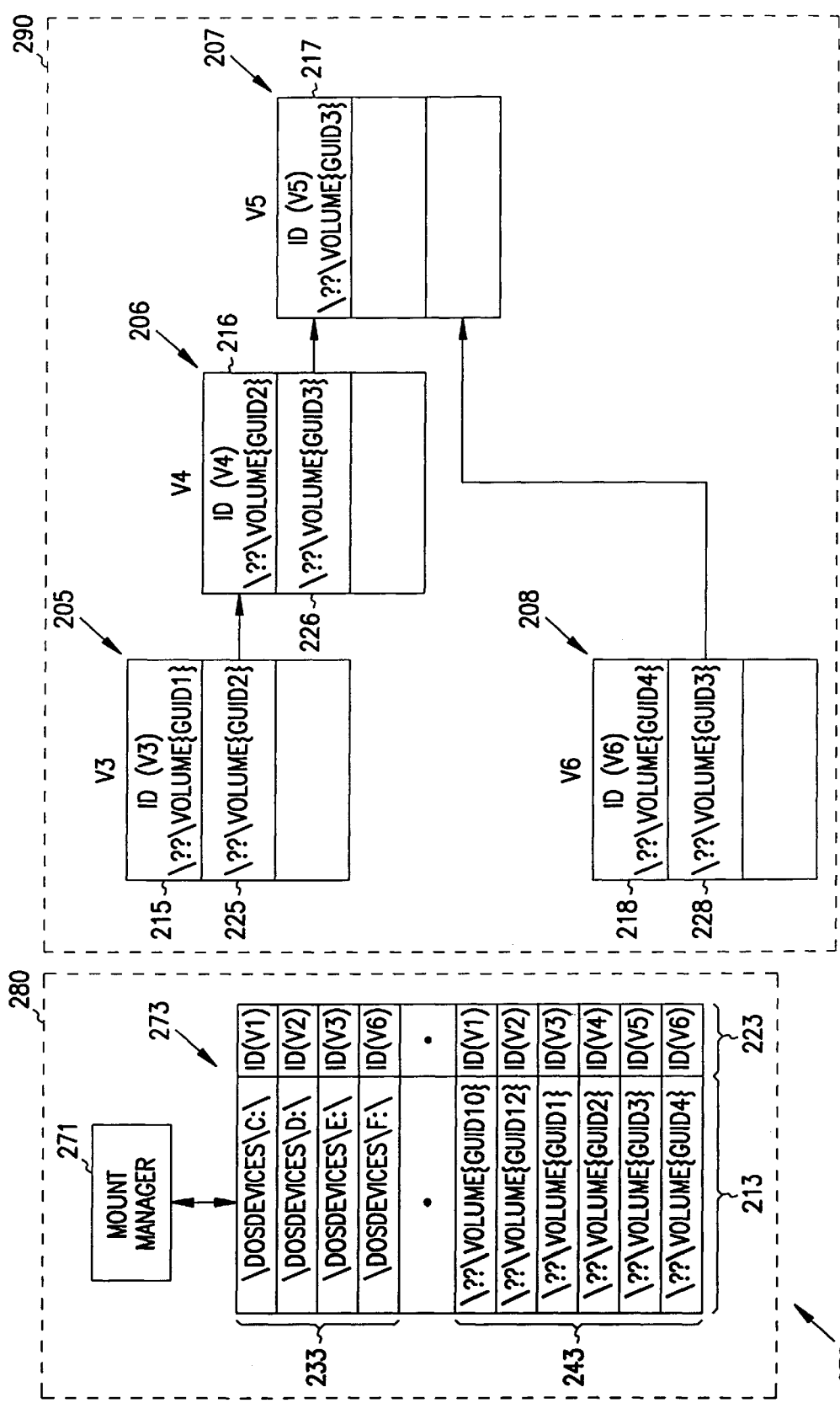
FIG. 2B illustrates the exemplary embodiment of the invention shown in FIG. 2A after being transported to a different computer.

Referring now to FIG. 2B, when the logical volumes 205–208 making up the global namespace 260 are first mounted in another computer 270, the mount manager 271 in the computer 270 recognizes that the logical volumes 205–208 are new because there are no entries corresponding to the mount names in its data structure 273. The mount manager 271 creates new entries in the data structure 273 for the logical volumes 205–208 and assigns drive letters to logical volumes 205–208. The mount manager 271 requests the operating system of the computer 270 to create the symbolic links between the mount names, drive letters, and the device names given to the logical volumes 205–208 by the operating system of the computer 270. Note that the drive letter redirected names, unique volume identifiers, and device names for logical volumes 205 and 208 change when introduced into the computer 270, as shown in FIG. 2B, but the globally unique mount name serves to uniquely identify the logical volumes despite such changes.

The mount manager 271 then processes the directory junction data 225, 226 and 228 on the logical volumes 205, 206 and 208 to reconstitute the proper internal hierarchical relationships among logical volumes 205–208 in the global namespace 290 of the computer 270.

When the logical volumes 205–208 are permanently removed from the computer 200 to be placed in the computer 270, the operating system notifies the mount manager 201 which deletes the corresponding entries from the data structure 203 and breaks the symbolic links.

However, if a logical volume is only removed temporarily, the mount manager 201 only breaks the corresponding symbolic links. If the logical volume is re-introduced in the same boot session, the device name is different because a device name is used only once during a boot session, but the mount manager 201 finds the appropriate entry 243 based on the unique volume identifier. Because the entry is present, the mount manager 201 requests the operating system re-establish the corresponding symbolic links.

Thus, the present invention guarantees that symbolic links will always resolve to the correct logical volume, both during a boot session and across multiple boot sessions, during the life of the logical volume.

In an alternate embodiment of the logical volume mounting subsystem, the mount manager 201 copies the persistent mount manager data structure 203 into memory so that the time required to mount logical volumes and to detect configuration changes during a boot session is decreased. The in-memory data structure is, by its nature, non-persistent across boot sessions and is recreated during the boot process. In still another alternate embodiment, the mount manager 201 creates an in-memory data structure in which each entry contains the device name of the logical volume represented by the entry.

The system level overview of the operation of an exemplary embodiment of the invention has been described in this section of the detailed description. A mount manager and supporting data structures enable consistent identification and addressing of logical volumes despite physical configuration changes for the life of the logical volumes through the use of persistent user-friendly redirected names. The mount manager also stores directory junction information on logical volumes so that the namespace represented by the logical volumes is self-describing. While the invention is not limited to any particular arrangement of data in the data structures or any particular user-friendly format for the redirected names, for sake of clarity exemplary embodiments of persistent and in-memory data structures and redirected names have been illustrated and described.

Methods of an Exemplary Embodiment of the Invention

In the previous section, a system level overview of the operation of an exemplary embodiment of the invention was described. In this section, the particular methods performed by a computer executing an exemplary embodiment is described by reference to a series of flowcharts. The methods to be performed by a computer constitutes computer programs made up of computer-executable instructions. Describing the methods by reference to a flowchart enables one skilled in the art to develop such programs including such instructions to carry out the methods on suitable computers (the processor of the computers executing the instructions from computer-readable media). The methods are illustrated in FIGS. 3A–E and are inclusive of the steps or acts required to be taken by the mount manager 201 operating in the environment shown in FIG. 2A and having an in-memory data structure that contains the device names of logical volumes. As discussed in the previous section, the mount manager and data structures described in the section are included for ease in explaining the methods of the invention and should not be taken as limiting the use of the persistent volume mount points to only the embodiment described herein.

Figure 3A:
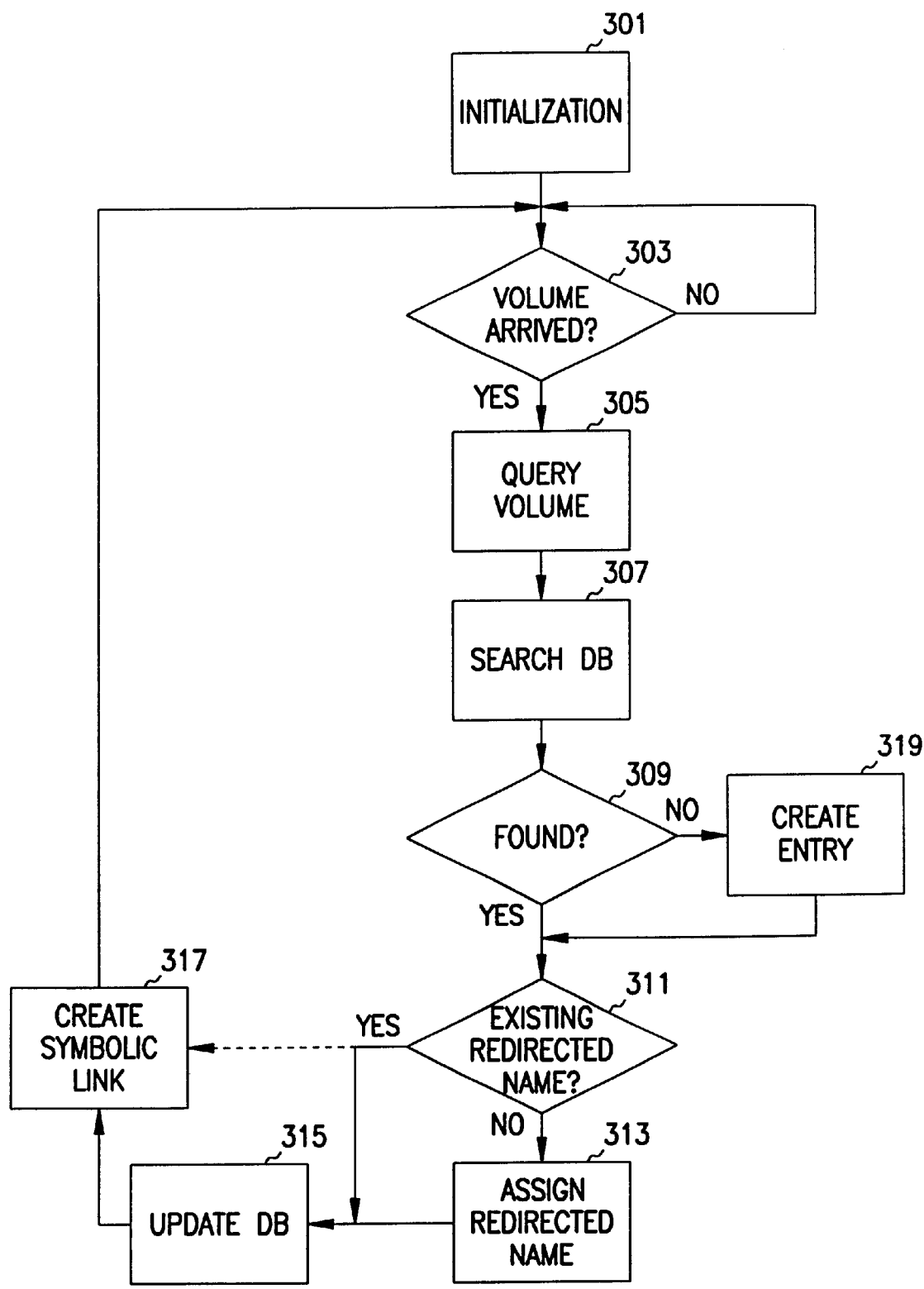
FIGS. 3A, 3B, 3C, 3D and 3E are flowcharts of method to be performed by a computer system according to an exemplary embodiment of the invention.

Referring first to FIG. 3A, when the computer is booted, the mount manager 201 creates an in-memory data structure from the persistent mount manager data structure 203 (step 301). Upon initial boot of the computer, the persistent mount manager data structure 203 contains only drive letter redirected names as no logical volumes have yet been configured in the system. Upon subsequent boots, the persistent mount manager data structure 203 contains drive letters, persistent mount names, and unique volume identifiers for the logical volumes that were not known to be permanently deleted in the system when it was shut-down.

After initializing its in-memory data structure, the mount manager 201 waits for notification from the operating system that a logical volume has been detected in the computer (step 303). When the notification arrives, either during the boot process or during the boot session, the mount manager 201 queries the volume for its unique volume identifier and its boot session device name (step 305). The mount manager 201 uses the unique volume identifier to search the in-memory data structure for a matching entry (step 307). If a matching entry is found (step 309), the mount manager 201 checks the entry to determine if any redirected name has been previously assigned to the volume (step 311).

If the entry contains a redirected name(s), the mount manager 201 updates the in-memory data structure with the device name at step 315, and causes the operating system to create a symbolic link between the redirected name(s) and the boot session device name (step 317). Thus, the redirected name(s) used by the higher layers of the operating system and user applications are preserved across boot sessions, even though the device names may change when the physical configuration of the computer is modified. In an alternate embodiment in which the in-memory data structure does not contain the device name field, the mount manager 201 skips step 315, as both the in-memory and persistent data structures already contain the correct unique volume identifier and redirected name(s) (illustrated by a phantom logic flow path in FIG. 3A).

When a logical volume is being re-introduced into the system, either during a boot or during a boot session, if the entry does not contain redirected name(s) (step 311) as discussed above, then the mount manager 201 queries the logical volume for its "desired" redirected name(s) (step 313) and updates the corresponding entries in the persistent and in-memory data structures with the device names and/or redirected name(s) as appropriate. The mount manager 201 then requests the creation of the symbolic links (step 317).

If there is no existing data structure entry that matches the unique volume identifier (step 309), the mount manager 201 creates an entry for the logical volume (step 319) by inserting the unique volume identifier in an empty entry. The mount manager 201 creates a persistent mount name for the new logical volume (step 313). If requested to do so by the operating system, the mount manager 201 also assigns the next available drive letter to the new logical volume at step 313. The mount manager 201 informs the logical volume of the assigned redirected name(s) so they can be stored for later use. The mount manager persistent and in-memory data structures are updated with the redirected name(s) (step 315), and the corresponding symbolic links created (step 317).

Figure 3B:
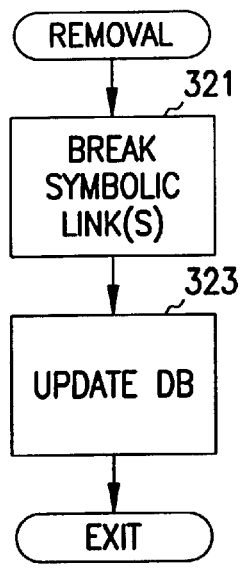

The mount manager 201 is also notified by the operating system when a logical volume is temporarily removed from the computer as shown in FIG. 3B. All symbolic links associated with the logical volume are retired (step 321). The mount manager 201 updates its persistent and in-memory data structures by deleting the device name for the logical volume from all entries associated with the logical volume. The unique volume identifier is maintained in the entries to detect the re-introduction of the logical volume (refer to step 309 in FIG. 3A).

Figure 3C:
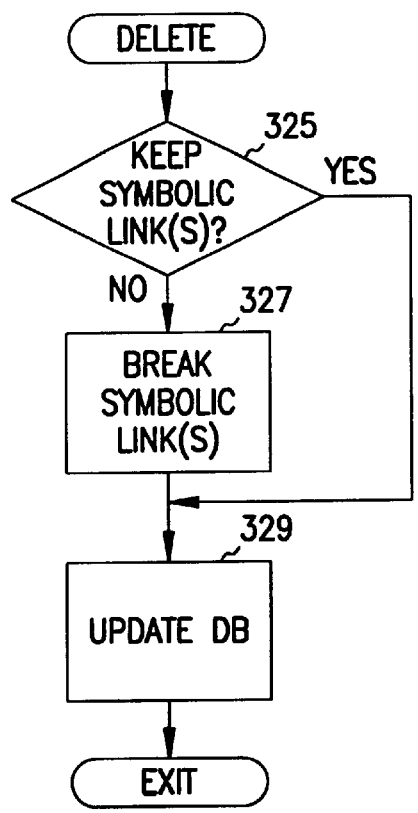

The mount manager 201 also provides for deleting the symbolic links and mount manager data structure entries associated with the logical volume as illustrated in FIG. 3C. When requested to do so by the operating system 205, the mount manager 201 retires the corresponding symbolic links (step 327), and deletes the unique volume identifier, device name, and persistent mount name for the logical volume from all the appropriate entries in the mount manager persistent and in-memory data structures (step 329). The operating system makes this request when a logical volume is permanently deleted from the system but the operating system can also make the request without deleting the logical volume. However, if the logical volume is not deleted and is being accessed by a higher-layer application, only the data structure entries are modified as described above at step 323. The symbolic link(s) are maintained so that the applications can continue to access the data on the logical volume.

Figure 3D:
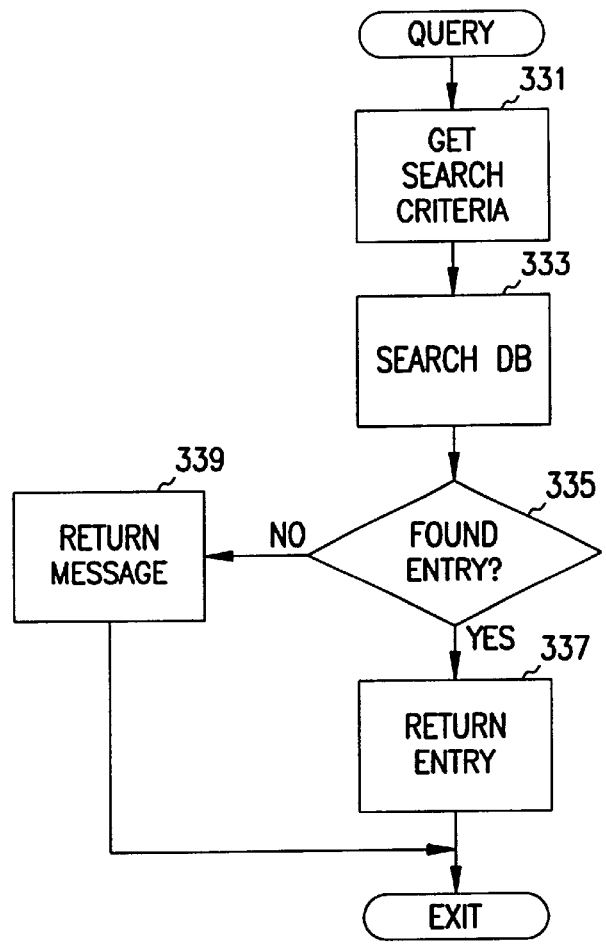

FIG. 3D illustrates the query function of the mount manager 201. The operating system queries the mount manager 201 regarding a mounted logical volume by passing the symbolic link name, the unique volume identifier, or the boot session device name of a logical volume to the mount manager 201 at step 331. The mount manager 201 searches its in-memory data structure, if present, or its persistent data structure (step 333) and returns the corresponding entry if one is found (step 337). If no entry matches the search criteria, the operating system is so informed (step 339). If the device name is used as the search criteria and there is no in-memory data structure, or if the in-memory data structure does not contain the device name, the mount manager 201 uses the symbolic link to determine the redirected name in order to perform the search.

Figure 3E:
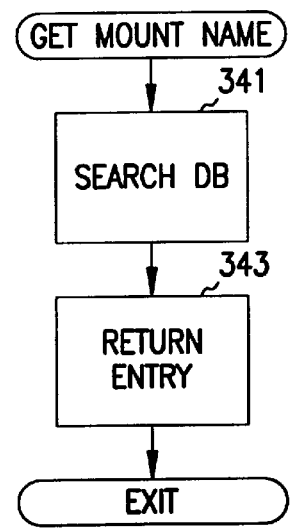

FIG. 3E illustrates the steps taken by the mount manager 201 when the operating system informs it that a new directory junction is being created. The mount manager 201 searches its data structure to find the entry corresponding to the unique identifier for the target logical volume (step 341) and returns the mount name (step 343) to the operating system for storage in the directory junction mount point.

The methods performed by a mount manager of an exemplary embodiment of the invention have been described with reference to a series of flowcharts illustrated in FIGS. 3A–E, including all the steps from 301 until 343 shown therein. In particular, the methods of associating user-friendly drive letter and mount names with logical volumes, associating directory junctions with logical volumes, and the management of such associations have been described.

Microsoft Windows NT 5.0 Implementation

In this section of the detailed description, a particular implementation of the invention is described that executes as part of the Microsoft Windows NT 5.0 operating system kernel. In the implementation illustrated in FIG. 4, the mount manager 401 and four other kernel modules work together to provide a user with access to data stored on a physical storage device 411 (shown as a fixed hard disk): a plug and play manager 403, an object manager 405, a partition manager 407, and at least one volume manager 409.

The mount manager 401 is not limited to use with only devices that adhere to the partition manager and volume manager architectures described below. The mount manager 401 will manage any device which registers with the plug and play manager 403 which has some mechanism for reporting a device name and a unique identifier that is persistent between boots. The partition manager 407 and the volume manager 409 are shown and described for the sake of clarity in understanding the invention.

As described above, the mount manager 401 is responsible for associating redirected names with unique volume identifiers for logical volumes and associating directory junctions with the logical volumes to be mounted at the directory junction.

Figure 4:
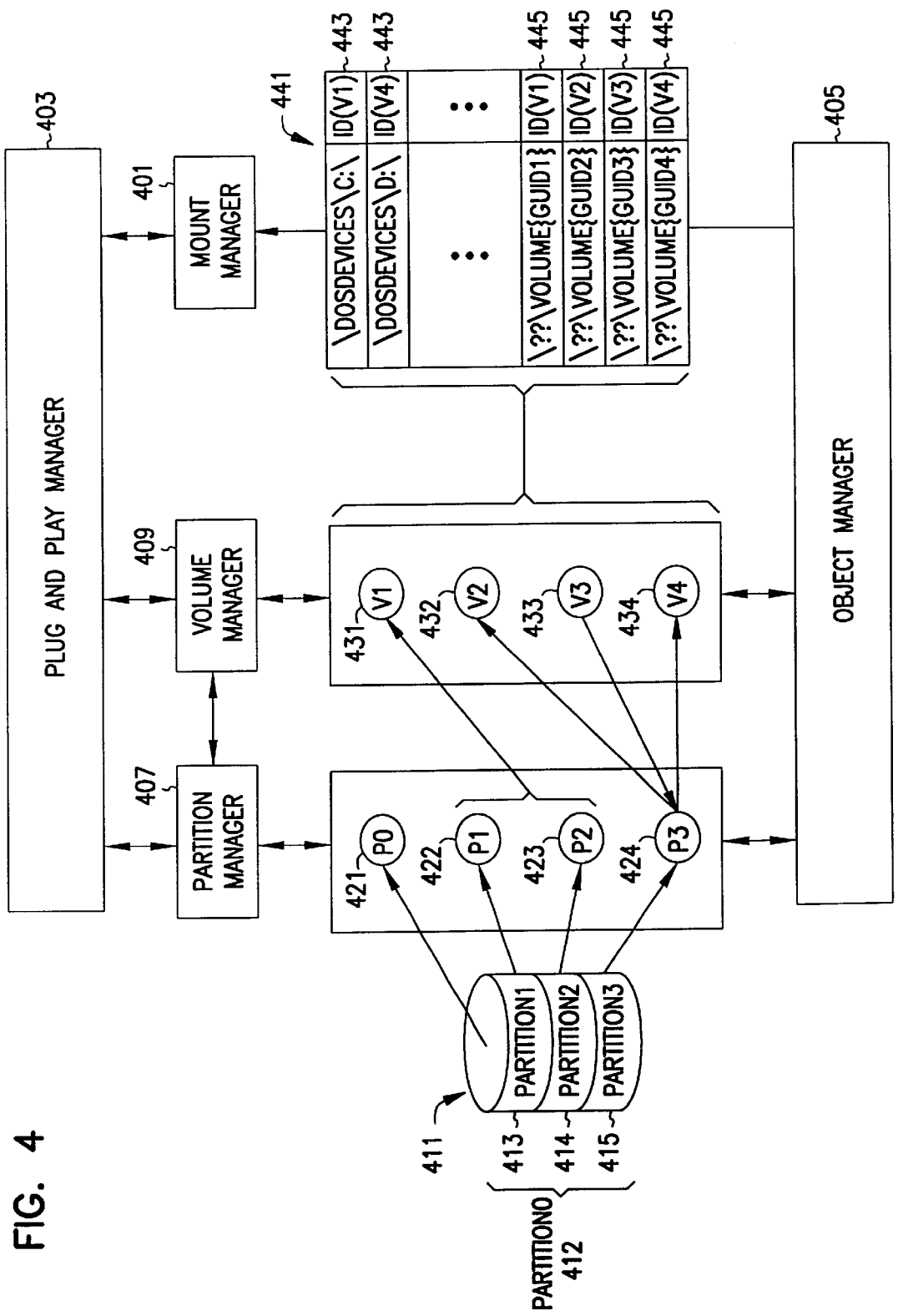
FIG. 4 is a diagram illustrating a particular embodiment of the invention in a Microsoft Windows NT environment.

In the NT 5.0 embodiment, the mount manager 401 persistent data structure is stored in the NT registry. Alternate embodiments in which the persistent data structure is stored in non-volatile memory, such as battery-backed RAM or flash memory, will be readily apparent to one skilled in the art and are contemplated as within the scope the invention. The mount manager 401 also builds an in-memory data structure from the persistent data structure to decrease the time required to react to configuration changes in the system. In FIG. 4, data structure 441 is representative of both the in-memory and persistent data structures.

Because NT 5.0 is an object-based operating system, every device, either physical, logical, or virtual, within the system is represented by a device object. The objects are organized into a device hierarchy in a global namespace controlled by the object manager 405. The object manager 405 is also responsible for creating and maintaining symbolic link objects which serve as aliases for named device objects. The mount manager redirected name is represented in the namespace by a symbolic link object which contains the non-persistent device name of the corresponding logical volume. Thus, an "Open" command operating on a redirected name symbolic link object is the same as an "Open" command on the logical volume device object having the device name contained in the symbolic link object.

The partition manager 407 is responsible for handling device objects associated with logical divisions, partitions 412, 413, 414, and 415, of a physical device 411. The partitions 412–415 are created when the physical device 411 is formatted. The partition 412 comprises the entire physical device 411, while the partitions 413–415 are sub-divisions of the physical device 411. A device driver (not shown) for the physical device 411 "enumerates" corresponding partition device objects 421, 422, 423, and 424 when the computer is booted. The partition manager 407 and at least one volume manager 409 cooperate to create logical volumes from the partitions 413–415. The composition of a logical volume is defined when the physical device is formatted, and can comprise one or more partitions. Additionally, one partition can comprise more than one logical volume. A unique volume identifier for the logical volume is stored in a privileged section of the physical device, or devices, that contain the partitions making up the logical volume. The volume manager, or the device driver in the case of a removable device, responsible for the volume device object creates the unique volume identifier.

When the partition manager 407 is initialized, it requests notification from the plug and play manager of all volume managers 409 registered in the system. As each volume manager 409 registers, the plug and play system notifies the partition manager 407 which maintains a list of the volume managers 409 ordered by their arrival in the system.

When the physical device 411 is detected by the plug and play manager 403 upon booting the system, the plug and play manager 403 determines the formatted characteristics of the physical device 411. The plug and play manager 403 loads the appropriate device driver to handle I/O access to the device. The device driver enumerates the partition device objects 421–424 used to access the data. As each partition device object 422–424 not representative of the entire device is enumerated by the device driver, the partition manager 407 "captures" the partition device object 422–424 before the driver registers the object with the plug and play manager 403. The partition manager 407 presents each partition device object 422–424 to the volume managers 409 in the order in which the volume managers 409 arrived in the system. Because each partition device object 424–424 is associated with at least one logical volume, the volume manager 409 responsible for the corresponding logical volume(s) accepts the device object.

When a volume manager 409 has received a sufficient number of partition device objects corresponding to a particular logical volume, the volume manager 409 assigns a device name to the logical volume and enumerates a volume device object 431, 432, 433 or 434 for the logical volume containing the device name and the unique volume identifier for the logical volume. In the NT 5.0 embodiment, the device name is guaranteed to be unique during a boot session, while the unique volume identifier is guaranteed to be unique across boot sessions. A counted string is used as the unique volume identifier in the NT 5.0 environment but a fixed length string can be equally applicable in other operating system environments. The counted string is as long as necessary to uniquely identify the device in the computer across multiple boot sessions. The volume device object 431–434 is stored by the object manager 405 in the device hierarchy by its device name. The volume manager 409 informs the plug and play manager 403 of the creation of the volume device object 431–434.

Each volume device object 431–434 is presented to the mount manager 401 by the plug and play manager 403. The mount manager 401 queries the volume device object 431–434 for its device name and unique volume identifier. Because of the indeterminate length of the unique volume identifier, the volume device object returns a byte count along with the string.

The mount manager 401 scans its internal data structure 441 (in-memory or persistent) looking for a matching entry for the unique volume identifier of the volume device object 431–434. If none is found, this particular logical volume is new to the system, so the mount manager 401 assigns it a unique persistent mount name as described above, and creates an entry for the logical volume in the mount manager data structure(s) 441. In the NT 5.0 embodiment, the GUID in the persistent mount name is 16 bytes represented in hexadecimal as xxxxxxxx-xxxx-xxxx-xxxx-xxxxxxxxxxxx. A GUID is comparable to the UUID (universally unique identifier) specified by the Open System Foundation. The mount names for logical volumes 431 and 434 begin with ??which designates the entry point in the global namespace device hierarchy for logical volumes and is synonymous with DosDevices. The persistent mount name of either format is generated by an mount manager subroutine called "CreateNewVolumeName."

After a new entry is created, or if a matching entry is found, the mount manager 401 requests that the object manager 405 create a symbolic link object to represent the relationship between the device name and the persistent mount name for the logical volume.

In order to facilitate the assignment of drive letter redirected names to logical volumes, the mount manager data structure(s) 441 contains an entry for each of the twenty-four drive letters assignable to fixed hard disks, i.e., DosDevicesC:–DosDevicesZ:. The entries are sorted in alphabetical order. Upon the initial boot of the computer, only the logical boot volume is assigned a drive letter (such as DosDevicesC:) When a drive letter is requested for a logical volume by the plug and play manager 403 during the initial boot process, the mount manager 401 assigns the next available drive letter by storing the unique volume identifier in the corresponding entry in the data structure(s) 441. The mount manager 401 requests that the object manager 405 create a symbolic link object representing the association between the drive letter and the volume device name.

On subsequent boots, each logical device is assigned its previous drive letter if one is present in the data structure(s) 441. If a new logical device is introduced into the system during the boot process, the plug and play manager 403 must request the assignment of a drive letter. On the other hand, a new logical volume that is introduced during a boot session is automatically assigned the next available drive letter.

The plug and play manager 403 also informs the mount manager 401 when a logical volume will be temporarily removed from the boot session. The mount manager 401 deletes the device names, if present, from the appropriate entries in the data structure(s) 441. The mount manager 401 also causes the object manager 405 to retire the symbolic link objects between the volume device name and the drive letter and/or persistent mount name.

If the logical volume is reintroduced into the system during the same boot session, the volume manager will assign a different device name because the device names are guaranteed not to be reused during a boot session, but the unique volume identifier will be the same. Because the mount manager 401 has not deleted the unique volume identifier from the entries in the data structure(s) 441, the mount manager 401 recognizes the logical volume if it is reintroduced and uses the data structure entries to recreate the same symbolic link objects as before so that consistency can be maintained.

If the logical volume is permanently deleted, its unique volume identifier and persistent mount name are also removed from the data structure(s) 441 and any now-empty entries are freed.

The partitions comprising a logical volume can change without deleting the volume if the logical volume is a mirrored volume that has been broken or a striped set that has been rebuilt Under such circumstances, the device name does not change, but the unique volume identifier associated with the logical volume does. The volume manager 409 so informs the mount manager 401 which updates the data structures to reflect the change in the unique volume identifier.

The mount manager 401 communicates with the logical volume device objects 431–434 through an application program interface (API) having six calls:

QueryDeviceName (pointer to device object);
QueryUniqueId (pointer to volume device object);
QueryDesiredName (pointer to volume device object);
QueryUniqueIdChangeNotify (pointer to volume device object);
LinkCreated (pointer to volume device object); and
LinkDeleted (pointer to volume device object), where the pointer to a device object is passed to the mount manager 401 by the plug and play manager 403.

The interface between the mount manager 401 and volume device objects is identified by a GUID called the "mounted_device_GUID." Any device object that declares support for the mounted_device_GUID must implement at least QueryDeviceName and QueryUniqueId.

QueryDeviceName and QueryUniqueId return the device name and unique volume identifier for the specified volume device object. QueryDesiredName returns a recommended redirected name(s) for the mount manager 401 to use in the event that the mount manager data structure(s) 441 does not yet contain any entries for the specified volume device object. A physical device that supports QueryDesiredName usually stores the desired name(s) in the same privileged area of the physical device as the unique volume identifier.

The mount manager 401 uses QueryUniqueIdChangeNotify to determine if the unique volume identifier for the specified logical volume device object has changed. Such a change is usually due to a change in the location for the volume but other circumstances can also cause the unique volume identifier to change. The mount manager 401 then updates the unique volume identifier in the data structure entries associated with the device name.

LinkCreated and LinkDeleted are used by the mount manager 401 to inform the volume device object of the creation and deletion of the redirected names and the symbolic link objects that reference the volume device object. A physical device that supports LinkCreated and LinkDeleted can use the information to update any redirected name(s) it has internally stored.

The mount manager 401 also provides an API with the plug and play manager 403 for managing the association between unique volume identifiers and the redirected names:

QueryPoints (drive letter/*, unique volume identifier/*, device name/*);
DeletePoints (drive letter/*, unique volume identifier/*, device name/*);
DeletePointsDBOnly (drive letter/*, unique volume identifier/*, device name/*);
CreatePoint (drive letter, device name);
NextDriveLetter (device name);
AutoDriveLetter;
FindFirstVolume; and
FindNextVolume (persistent mount name).

QueryPoints is called by the plug and play manager 403 to retrieve the entry in the mount manager data structure 441 for a logical volume. The plug and play manager 403 specifies the drive letter, the unique volume identifier, or any device name associated with the logical volume as search criteria to be used by the mount manager 401 (* is a "wild card" that matches all entries).

DeletePoints causes the mount manager 401 to return the corresponding entries from the data structure 441 and then perform the deletion steps described above to delete all entries and symbolic link objects associated with the volume device object. If a drive letter for a logical volume is explicitly deleted, i.e., not as the result of a wildcard operation, then an indicator associated with the unique volume identifier is set to alert the mount manager 401 that the logical volume is not to be assigned a drive letter if it is re-introduced into the system. DeletePoints is used when a logical volume is permanently deleted from the system or to disassociate a logical volume from some or all of its existing redirected names even though the logical volume itself is still present in the system. DeletePointsDBOnly operates as does DeletePoints but does not delete the symbolic link object(s). DeletePointsDBOnly is used when a logical volume is not deleted or removed and a user application is currently accessing data on the logical volume.

CreatePoint causes the mount manager 401 to assign the specified drive letter to a logical volume which previously had its drive letter deleted through either DeletePoints or DeletePointsDBOnly.

In order to preserve the historical drive letter assignments across boot sessions, the mount manager 401 does not automatically assign a drive letter to a logical volume during the boot process unless the logical volume had previously been assigned a drive letter. Therefore, the plug and play manager 403 uses NextDriveLetter to request that the mount manager 401 assign a drive letter to the logical volume associated with the device name specified in the call. NextDriveLetter returns the current drive letter and an indication of whether a drive letter was assigned. A drive letter cannot be assigned if no drive letter is available or if the logical volume represented by the device name is already assigned a drive letter. The plug and play manager 403 can also use AutoDriveLetter once the historical assignments have been made to request the mount manager 401 assign drive letters to all subsequent logical volumes upon arrival.

Because the mount manager 401 does not necessarily assign a drive letter to a logical volume, the mount manager 401 provides two calls that enumerate the persistent mount names present in the system. The symbolic link objects can then be used to determine the device name of the associated logical volume. FindFirstVolume returns the persistent mount name found in the first entry in the mount manager data structure 441. FindNextVolume returns the persistent mount name in the entry following the entry containing the specified persistent mount name.

The relationships among logical volumes is determined through three calls:

FindFirstVolumeMountPoint (root directory name);

FindNextVolumeMountPoint (directory junction name); and

GetVolumeNameForVolumeMountPoint (directory path, directory junction name).

The root directory name argument in FindFirstVolumeMountPoint is the root directory of the local namespace for a logical volume and can be specified as either a drive letter or mount name redirected name. The first assigned drive letter is used as the argument in FindFirstVolumeMountPoint to determine the first directory junction name on the logical volume assigned the first drive letter. Thee directory junction name returned by FindFirstVolumeMountPoint can be used as input to GetVolumeNameForVolumeMountPoint to determine the mount name for target logical volume to be mounted at the first directory junction. The first directory junction name is used to query the logical volume for the next directory junction name through FindNextVolumeMountPoint. Using the combination of FindNextVolumeMountPoint and GetVolumeNameForVolumeMountPoint returns all the directory junctions on the logical volume identified by the drive letter. For logical volumes which are not assigned drive letters, the mount name is used as input to FindFirstVolumeMountPoint to begin the process of finding directory junctions on such logical volumes.

The mount manager 401 accepts two calls to maintain the namespace hierarchy:

SetVolumeMountPoint (directory path/drive letter, mount name); and

DeleteVolumeMountPoint (directory path/drive letter).

SetVolumeMountPoint causes the mount manager 401 to update the data structure 441 with the specified mount name and directory name, if the directory is empty, or specified mount name and drive letter if the drive letter is not in use. The mount manager 401 requests that the object manager 405 create the appropriate symbolic link object to represent the relationship between the device name of the logical volume identified by the mount name or drive letter. The unique identifier and the mount name are also stored on the physical device underlying the host logical volume in a named datastream ":$MountMgrRemoteDatabase." DeleteVolumeMountPoint causes the mount manager 401 to delete the appropriate entries from the data structure 441 and, if the input argument is a directory path, to delete the directory junction data from the named datastream. The mount manager 401 also requests that the object manager 405 destroy the corresponding symbolic link object.

The mount manager 401 provides a query, GetVolumePathName (directory path), for use by device drivers when parsing pathnames as described above. For a given pathname, GetVolumePathName returns the longest directory prefix in the specified pathname that corresponds to a logical volume. Thus, referring once again to FIG. 2A, GetVolumePathName (DosDevicesC:ProgrammingProjectsfilename) returns "DosDevicesC:ProgrammingProjects," GetVolumePathName (DosDevicesC:ProgrammingProjects) returns "DosDevicesC:Programming," and GetVolumePathName (DosDevicesC:Programming) returns "DosDevicesC:."

Thus, the invention guarantees the same redirected name (s) will be associated with the same logical volume across any number of boots or reconfigurations as long as the logical volume itself remains valid. The persistence of the redirected names enables the creation of a self-describing namespace in a computer so that the underlying physical devices can be moved within a computer and between computers without the necessity of operator intervention. Therefore, the invention guarantees that I/O commands on a redirected name are resolved through the symbolic link objects to the current device name for the correct logical volume without modification to the higher layers of the operating system and user applications despite changes in the physical configuration of the computer.

Conclusion

Unique volume identifiers for logical volumes are have been described as used to associate logical volumes created from computer system storage devices with persistent "redirected" mount names to create a self-describing namespace on the computer. Information regarding volume mount points hosted by a logical volume are stored on the physical device underlying the logical volume so that the relationships between the host logical volume and target logical volumes mounted on the volume mount points can be reconstituted when the system containing the logical volumes is rebooted, when the underlying physical devices are moved with the system, and when the logical volumes are transported to a different system.

A data structure stored on the physical device contains the directory name of the volume mount point and the unique identifier and a globally unique mount name of the target logical volume mounted at the volume mount point. When the target logical volume is present in the system, symbolic links are created to relate the volume mount point name to a device name for the target logical volume so that pathnames containing the directory junction name are resolved correctly. If the target volume is not present in the system, the corresponding symbolic link does not exist, so an incorrect logical volume cannot be mounted onto a volume mount point.

When the physical configuration of the computer changes, the device name changes but the unique volume identifier does not. The unique volume identifier is used to locate the appropriate mount name and/or drive letter in its data structure and a new symbolic link is created with the new device name so that the symbolic link resolves the mount name and/or drive letter to the correct logical volume under all circumstances.

Because of the level of indirection provided by the persistent mount names, the symbolic links can be torn down and rebuilt to point to different device names for the same logical volumes when necessary without requiring modification of the higher layers of the operating system and user applications. Thus, invention guarantees configuration consistency across boot sessions of the computer and ensures that access through a redirected name is resolved through the symbolic link to the current device name for the correct logical volume. Furthermore, because the logical volumes contain the directory junction information, neither user knowledge nor intervention is required to reconstitute the namespace representing the logical volumes.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all operating system and programing environments capable of implementing the mount manager and supporting data structures as described above. Therefore, it is manifestly intended that this invention be limited only by the following claims and equivalents thereof.

We claim:

1. A computerized method for managing a self-describing namespace comprising the steps of:
   locating a volume mount point in the namespace;
   creating, in a host logical volume for the volume mount point, a persistent association between the volume mount point and a unique mount name for a target logical volume mounted at the volume mount point if there is no existing association; and
   linking the unique mount name to a non-persistent device name for the target logical volume so that a reference to the unique mount name accesses data on the logical volume.

2. The computerized method of claim 1, further comprising:
   detecting the deletion of a volume mount point; and
   disassociating the volume mount point from the mount name for the target logical volume.

3. The computerized method of claim 2, further comprising unlinking the mount name from the non-persistent device name.

4. The computerized method of claim 1, wherein creating the persistent association comprises:
   storing, on a physical device corresponding to the host logical volume, a directory junction data structure comprising the mount name for the logical volume.

5. The computerized method of claim 1, further comprising:
   supplying, upon request, a pathname to the host logical volume for a specified volume mount point.

6. A computerized method for managing a self-describing namespace comprising the steps of:
   locating a volume mount point in the namespace;
   creating, in a host logical volume for the volume mount point, a persistent association between the volume mount point and a unique mount name for a target logical volume mounted at the volume mount point if there is no existing association, wherein the unique mount name is independent of the logical volume's physical location; and
   linking the unique mount name to a non-persistent device name for the target logical volume so that a reference to the unique mount name accesses data on the logical volume, wherein the persistent association can be created on a first computer and a second computer and the linking can be performed upon coupling the logical volume to the first computer or the second computer.

7. The computerized method of claim 6, further comprising:
   detecting the deletion of a volume mount point; and
   disassociating the volume mount point from the mount name for the target logical volume.

8. The computerized method of claim 7, further comprising unlinking the mount name from the non-persistent device name.

9. The computerized method of claim 6, wherein creating the persistent association comprises:
   storing, on a physical device corresponding to the host logical volume, a directory junction data structure comprising the mount name for the logical volume.

10. The computerized method of claim 6, further comprising:
    supplying, upon request, a pathname to the host logical volume for a specified volume mount point.

11. A computer-readable medium having computer executable instructions for performing a method for managing a self-describing namespace, the method comprising:
    locating a volume mount point in the namespace;
    creating, in a host logical volume for the volume mount point, a persistent association between the volume mount point and a unique mount name for a target logical volume mounted at the volume mount point if there is no existing association, wherein the unique mount name is independent of the logical volume's physical location; and
    linking the unique mount name to a non-persistent device name for the target logical volume so that a reference to the unique mount name accesses data on the logical volume.

12. The computer-readable medium of claim 11, wherein the method further comprises:
    detecting the deletion of a volume mount point; and
    disassociating the volume mount point from the mount name for the target logical volume.

13. The computer-readable medium of claim 12, wherein the method further comprises unlinking the mount name from the non-persistent device name.

14. The computer-readable medium of claim 11, wherein creating the persistent association comprises:
    storing, on a physical device corresponding to the host logical volume, a directory junction data structure comprising the mount name for the logical volume.

15. The computer-readable medium of claim 12, wherein the method further comprises:
    supplying, upon request, a pathname to the host logical volume for a specified volume mount point.

16. A computer-readable medium having computer executable instructions for performing a method for managing a self-describing namespace, the method comprising:
    locating a volume mount point in the namespace;
    creating, in a host logical volume for the volume mount point, a persistent association between the volume mount point and a unique mount name for a target logical volume mounted at the volume mount point if there is no existing association, wherein the unique mount name is independent of the logical volume's physical location; and
    linking the unique mount name to a non-persistent device name for the target logical volume so that a reference to the unique mount name accesses data on the logical volume, wherein the persistent association can be created on a first computer and a second computer and the linking can be performed upon coupling the logical volume to the first computer or the second computer.

17. The computer-readable medium of claim 18, wherein the method further comprises:
    detecting the deletion of a volume mount point; and
    disassociating the volume mount point from the mount name for the target logical volume.

18. The computer-readable medium of claim 19, wherein the method further comprises unlinking the mount name from the non-persistent device name.

19. The computer-readable medium of claim 17, wherein creating the persistent association comprises:
    storing, on a physical device corresponding to the host logical volume, a directory junction data structure comprising the mount name for the logical volume.

20. The computer-readable medium of claim 17, wherein the method further comprises:
   supplying, upon request, a pathname to the host logical volume for a specified volume mount point.

21. A method of maintaining a name space comprising:
   issuing by a process a mount point call having at least one parameter;
   receiving by a mount manager process the mount point call and parsing the call to retrieve the at least one parameter; and
   issuing by the mount manager process a response.

22. The method of claim 21, wherein the mount point call comprises a set volume mount point call, wherein the at least one parameter comprises a mount point and a mount name and wherein the response comprises creating an association between the mount point and the mount name.

23. The method of claim 22, wherein the mount point comprises a directory name.

24. The method of claim 22, wherein the mount point comprises a drive letter.

25. The method of claim 21, wherein the mount point call comprises a delete volume mount point call, wherein the at least one parameter comprises a mount point and a mount name, and wherein the response comprises removing an association between the mount point and the mount name.

26. The method of claim 25, wherein the mount point comprises a directory name.

27. The method of claim 25, wherein the mount point comprises a drive letter.

* * * * *

UNITED STATES PATENT AND TRADEMARK OFFICE
CERTIFICATE OF CORRECTION

PATENT NO.   : 6,421,684 B1
DATED        : July 16, 2002
INVENTOR(S)  : Cabrera et al.

It is certified that error appears in the above-identified patent and that said Letters Patent is hereby corrected as shown below:

Column 20,
Line 55, "18" should be -- 16 --
Line 60, "19" should be -- 17 --

Signed and Sealed this

Twenty-ninth Day of April, 2003

JAMES E. ROGAN
*Director of the United States Patent and Trademark Office*